US006590583B2

United States Patent
Soohoo

(10) Patent No.: US 6,590,583 B2
(45) Date of Patent: *Jul. 8, 2003

(54) METHOD FOR CONTEXT-PRESERVING MAGNIFICATION OF DIGITAL IMAGE REGIONS

(75) Inventor: Kenneth Soohoo, Redwood Shores, CA (US)

(73) Assignee: Planetweb, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/052,955

(22) Filed: Jan. 16, 2002

(65) Prior Publication Data

US 2002/0060680 A1 May 23, 2002

Related U.S. Application Data

(63) Continuation of application No. 09/026,295, filed on Feb. 19, 1998, which is a continuation of application No. 08/645,853, filed on May 14, 1996, now Pat. No. 5,754,348.

(51) Int. Cl.[7] .............................................. G09G 5/00
(52) U.S. Cl. ...................................................... 345/660
(58) Field of Search ................................ 345/418–419, 345/426, 698, 591–592, 629–630, 640, 660, 708, 671, 716, 690, 718–720, 756, 768, 790–791, 797, 817

(56) References Cited

U.S. PATENT DOCUMENTS 3,704,938 A * 12/1972 Fanselow ..................... 359/806
3,739,739 A *  6/1973 Brase ............................ 116/240
3,762,799 A * 10/1973 Shapiro ........................ 359/442
4,757,616 A *  7/1988 Hills .............................. 33/488
5,031,918 A *  7/1991 Brill ............................. 273/288
5,275,019 A *  1/1994 Pagani .......................... 63/15
5,283,560 A *  2/1994 Bartlett ......................... 345/729

(List continued on next page.)

FOREIGN PATENT DOCUMENTS

EP          0352741 A2 *  1/1990   ............ G09G/1/00

OTHER PUBLICATIONS

Harrison et al., "Transparent Layered User Interface: An Evaluation of a Display Design to Enhance Focused and Divided Attention", May 1995, Conference Proceedings on Human Factors In Computing Systems, pp. 317–324.*

(List continued on next page.)

*Primary Examiner*—Thu Nguyen
(74) *Attorney, Agent, or Firm*—Wilson Sonsini Goodrich & Rosati

(57) ABSTRACT

A method for digital image magnification in a graphical user interface is disclosed. In contrast with prior methods which magnify a selected region of an original image without preserving its context, the present method provides a method for magnification that allows simultaneous viewing of the magnified image and its unmagnified context. In a preferred embodiment, the method provides a floating window [122] superimposed on an original image. Displayed within the floating window is a magnified image of a selected region of the original image. The floating window is centrally positioned over the selected region. In one aspect of the invention, the floating window is partially transparent so that portions of the original image within the floating window [124] are displayed in a faint manner in comparison to portions of the original image outside the floating window [126]. As the selected region is moved, typically by a user-controlled pointing device, the floating window [122] also moves.

8 Claims, 6 Drawing Sheets

U.S. PATENT DOCUMENTS

| | | | | |
|---|---|---|---|---|
| 5,309,279 A | * | 5/1994 | Halstead | 359/442 |
| 5,369,527 A | * | 11/1994 | McCracken | 359/805 |
| 5,452,406 A | * | 9/1995 | Butler et al. | 345/426 |
| 5,689,287 A | * | 11/1997 | Mackinlay et al. | 345/427 |
| 5,754,348 A | * | 5/1998 | Soohoo | 359/802 |
| 5,818,455 A | * | 10/1998 | Stone et al. | 345/619 |
| 6,072,489 A | * | 6/2000 | Gough et al. | 345/803 |
| 6,184,859 B1 | * | 2/2001 | Kojima | 345/629 |

OTHER PUBLICATIONS

Robertson et al., "The Document Lens", Proceedings of the sixth annual ACM Symposium on User Interface software and Technology, pp. 101–108. Nov. 1993.*

GraphicConverter v.2.5.1. information.*

GraphicConverter 2.8 screen capture.*

"AboutGraphicConverter", printed from World Wide Web site: lemkesoft.de/us_geabout.html, Nov. 3, 1997, 2 pages.

"GraphicConverter version history", printed from World Wide Web site: lemkesoft.de/us_history.html#207, Nov. 3, 1997, 12 pages.

* cited by examiner

METHOD FOR CONTEXT-PRESERVING MAGNIFICATION OF DIGITAL IMAGE REGIONS

This application is a continuation of application Ser. No. 09/026,295, filed Feb. 19, 1998, which was a continuation of application Ser. No. 08/645,853, filed May 14, 1996, now U.S. Pat. No. 5,754,348 invented by Kenneth Soohoo, entitled "Method for Context-Preserving Magnification of Digital Image Regions".

BACKGROUND

The field of the invention relates generally to graphical user interfaces. More particularly, the field of the invention relates to a method for dynamically magnifying a moveable selected region of a digital image while preserving the visual context of the image.

When viewing images displayed on a computer or television screen, one often experiences difficulty discerning small details and would like to view a portion of the image in a magnified format. Conventional methods for digital image magnification solve this problem by replacing the original unmagnified image with a magnified image of a selected region of the original image. Although this provides a magnified format for viewing small details of the original image, it has the disadvantage that the context of the magnified image presented to the viewer is lost.

For example, FIG. 1 shows an original unmagnified image as it is displayed on a typical computer or television screen. After selecting a region 100 of the image, conventional magnification methods fill the entire screen with a magnified image of the selected region, as shown in FIG. 2. The magnified image displayed in FIG. 2, however, does not provide any context for the magnified region. Without contextual cues, the viewer can lose track of the meaning of the magnified image. Also, the image can be confused with other portions of the original unmagnified image. For instance, house 102 in FIG. 2 may be confused with house 104 in FIG. 1 since the houses are distinguishable only by their context. Some methods for magnification allow dynamic movement of the selected region 100 that is magnified. A pointing device is used to control the position of the magnified region while the magnified image is being viewed. Using this technique, however, one must determine the context of the magnified image by moving the selected region in various directions to bring the contextual information into view. This approach is both slow and inconvenient.

In view of the above problems present in conventional methods of image magnification, there is a need to provide an image magnification method that magnifies a selected region of an image while simultaneously preserving the continuity and integrity of the original unmagnified image that forms the visual context of the magnified region. There is also a need to provide a method of image magnification that permits dynamic control of the position of the magnified region and the degree of magnification. Other objectives and advantages will be apparent from the following description and drawings.

SUMMARY

In order to achieve the foregoing objectives and advantages, an aspect of the present invention provides a method for magnifying a selected region of an image while preserving the visual context of the region. A selected region of a digital image is magnified and displayed in a floating plane region superimposed on the original image. The floating plane region is also termed a magnifier since the image data in the floating plane may be selectively magnified to provide a greatly enlarged image of the selected region while preserving the visual context of the image outside the parameters of the magnifier. Because the floating plane area is smaller than the original image area, the context of the magnified region remains displayed around the magnified image. The area of the floating plane region is equal to a magnification factor times the area of the selected region. In another aspect of the invention, the selected region may be moved, e.g., in response to the movement of a user-controlled pointing device. As the selected region moves across the original image, the magnified image displayed in the floating plane region is dynamically modified.

In one implementation of the invention, the floating plane region is superimposed above the selected region so that the floating plane moves as the selected region moves. The effect is similar to that of a magnifying glass moving in a plane above the image. As the floating plane is moved, an aspect of the invention provides for restoring a portion of the original image which was previously covered by the floating plane. The visual context of the image is therefore preserved while enabling a movable portion of the image to be magnified.

It will be appreciated that preserving visual context is especially advantageous when magnifying a line of text or other image data whose interpretation is context dependent.

According to an aspect of the invention, the magnified image in the floating plane region can be superimposed on a moving image to provide a moving magnified image while preserving the visual context of the moving image on the computer screen.

DETAILED DESCRIPTION

Figure 3:
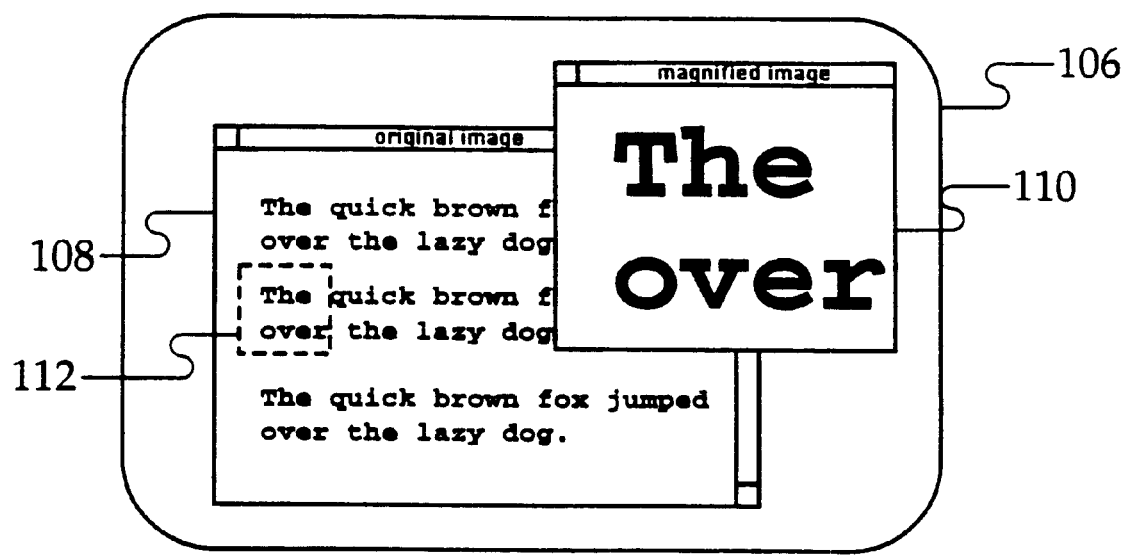
FIG. 3 shows the result of using a simplified embodiment of the invention to magnify a selected region of an original image.
Figure 4:
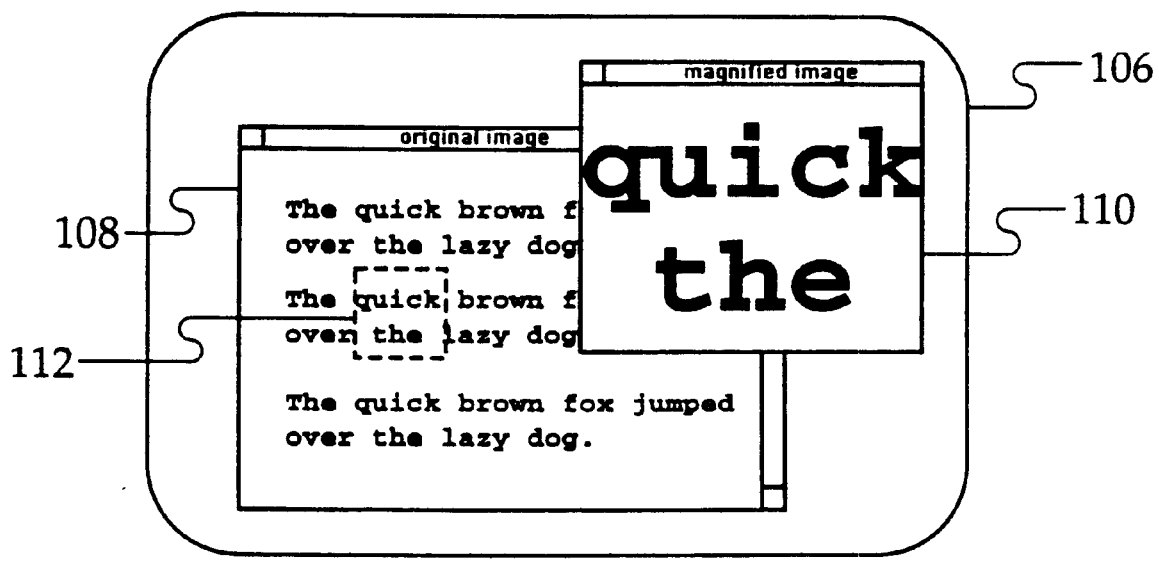
FIG. 4 shows the result of moving the selected region from the position shown in FIG. 3, according to a preferred embodiment of the present invention.

For the purposes of explanation, a simplified embodiment of the invention will be described first. The invention is presently executable on a Sega Saturn system. However, one skilled in the art would be readily capable of implementing the invention on any personal computer without undue experimentation. In this embodiment, an original image is magnified as shown in FIG. 3. Displayed on a computer screen 106 are an original image window 108 containing an original image, and a magnified image window 110 containing a magnified image. A selected region 112 of the original image is magnified and displayed within magnified image window 110. Typically, selected region 112 will have a position determined by a user-controlled pointing device, such as a mouse. In this example, selected region 112 contains two words of text. The enlarged text in the magnified image will provide an easy and convenient means for making the text in the selected region more legible. As shown in FIG. 4, as the selected region 112 is moved to a different part of the original image, the magnified image 110 changes accordingly. It is clear that this method of image magnification, in contrast to those of the prior art, preserves the context of the selected region while the magnified image is displayed.

Figure 5:
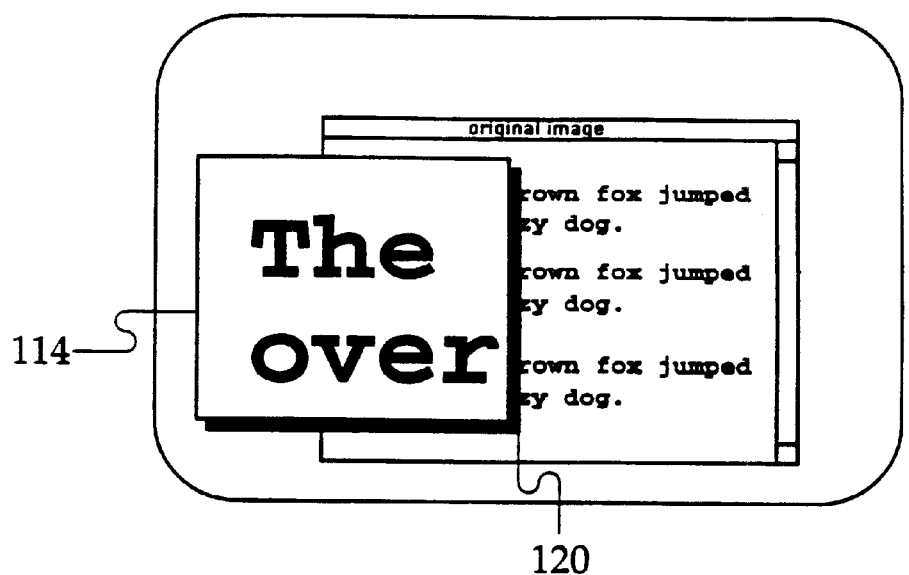
FIG. 5 shows the result of using a preferred embodiment to generate a floating plane region containing a magnified image of a selected region of the original image.
Figure 6:
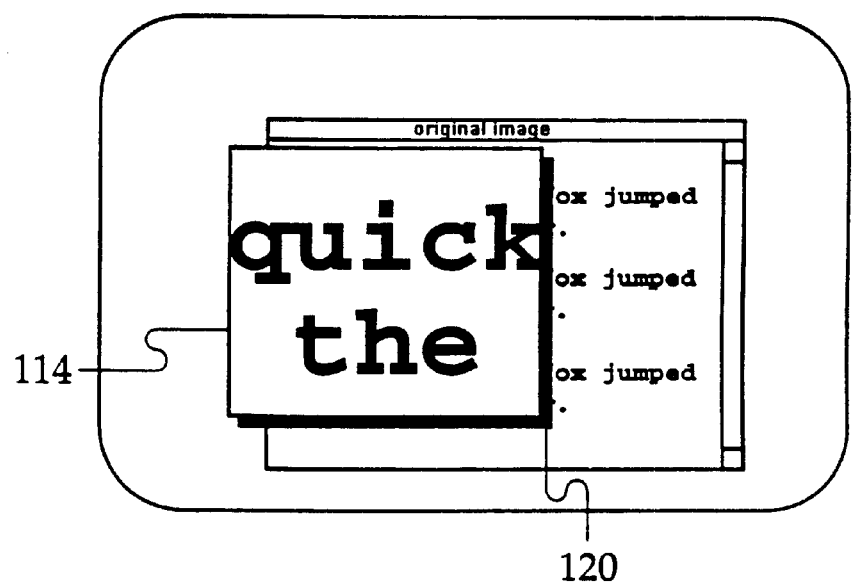
FIG. 6 shows the result of moving the selected region from the position shown in FIG. 5, according to the present invention.

In a preferred embodiment of the invention, the magnified image is displayed in a floating plane region 114, as shown in FIG. 5. Floating plane region 114 is a magnified image window that is positioned on top of the selected region, and moves as the selected region is moved. For example, FIGS. 5 and 6 show the movement of the floating plane region as the selected region is moved. The positions of the selected region in FIGS. 5 and 6 are the same as the positions of the selected region shown in FIGS. 3 and 4, respectively. The original image is preferably defined to be the entire screen, and is not necessarily restricted to an original image window, which is used in this description only for clarity of explanation.

It will be appreciated that the magnified image data in the floating plane region 114 are continually updated, as the floating plane is moved, to preserve the visual context of the underlying image. The image data outside the parameters of the magnified floating plane region 114 are also restored to preserve the preexisting visual context of the overall image. This aspect of the invention advantageously provides in-place magnification that can be dynamically moved while restoring underlying nonselected image data. This also provides the advantage of preserving and restoring the visual context of the entire image.

Figure 7:
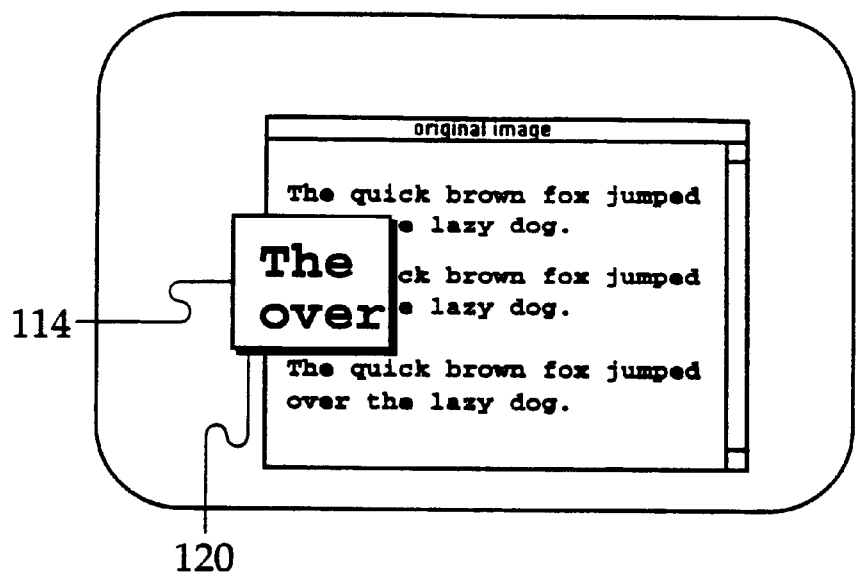
FIG. 7 shows an aspect of the present invention wherein the image is magnified to a lesser degree than that shown in FIGS. 3–6.
Figure 8:
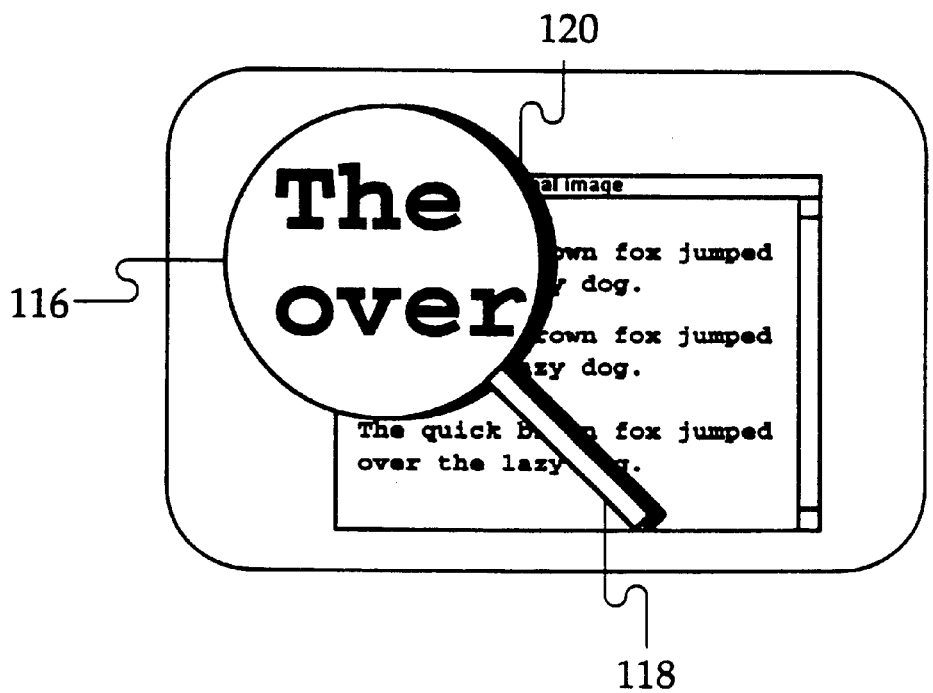
FIG. 8 shows the result of using an embodiment of the present invention wherein the floating plane region is circular.

In the preferred embodiment illustrated in FIG. 7, the size of the floating plane region 114 may be changed in size and the magnification factor may also be changed. That is, the plane region 114 provides a magnifier that can dynamically magnify a moveable selected region to any desired magnification factor while preserving the visual context of the preexisting image. As the magnification factor for the floating plane region 114 increases, the nonselected image data outside the parameters of the floating plane region are restored to preserve the visual context of the overall image. Anyone of ordinary skill in the art will appreciate that these and many other specifics may be changed as well. For example, FIG. 8 shows a variation of the preferred embodiment having a floating plane region 116 with a circular shape. A handle 118 attached to region 116 gives this variation of the invention the look and feel of a conventional magnifying glass. The preferred embodiment of the invention further includes a shadow region 120 having a shape corresponding to that of its corresponding floating plane region. Shadow region 120 provides the magnification method with the added advantage of helping distinguish the magnified region from the original image, and creates the illusion that the corresponding floating plane region is floating above the original image.

Referring to FIGS. 7 and 8, it will be appreciated that the magnifier or floating plane region 114, 116 also can have a rectilinear shape. A rectilinear magnifier has the advantage of preserving a line of text. Since text flows from left to right, moving a rectilinear magnified region from left to right has the advantage of communicating an increased amount of information from a line of text, while preserving the overall visual context of the page.

Figure 9:
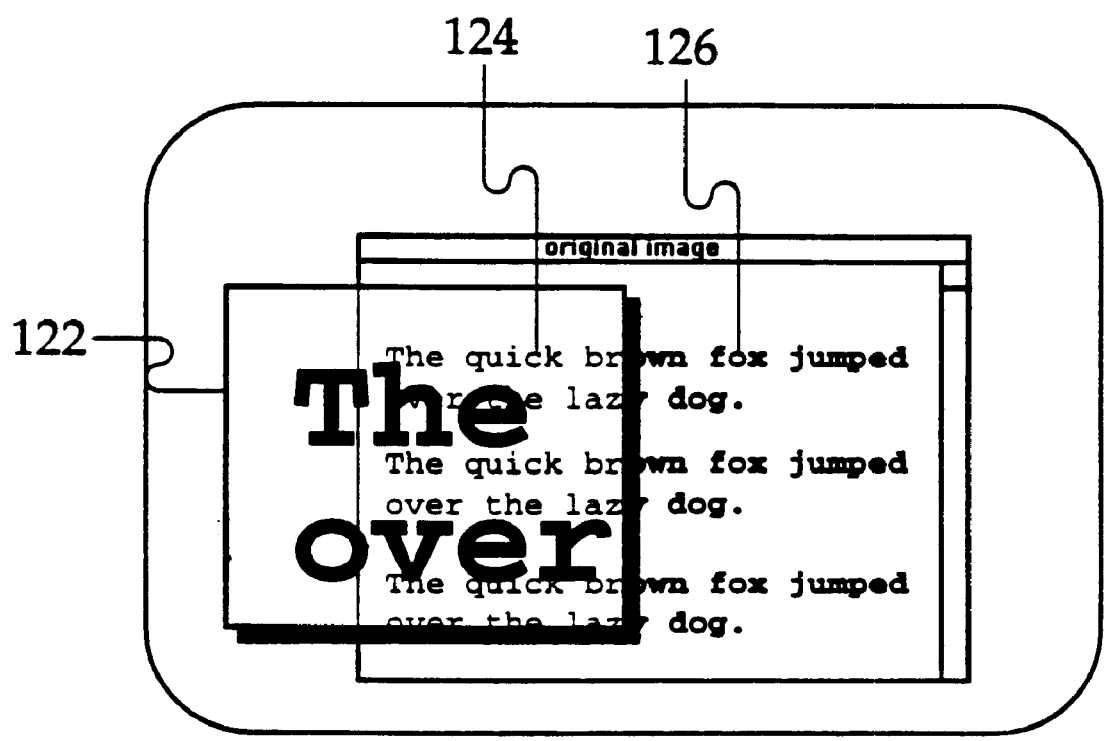
FIG. 9 shows an aspect of a preferred embodiment wherein the floating plane region is partially transparent.

In another aspect of the invention, a floating plane region 122 is provided which is transparent to the original image beneath it, as shown in FIG. 9. This feature has the advantage that it allows the user to see even more context. In order to prevent confusion within the floating plane between the magnified image and the original image, the floating plane is not fully transparent. As shown in FIG. 9, parts of the original image under the floating plane, such as the word "quick" 124, are faded or of reduced intensity compared with parts of the original image outside the floating plane, such as the word "fox" 126.

Figure 10:
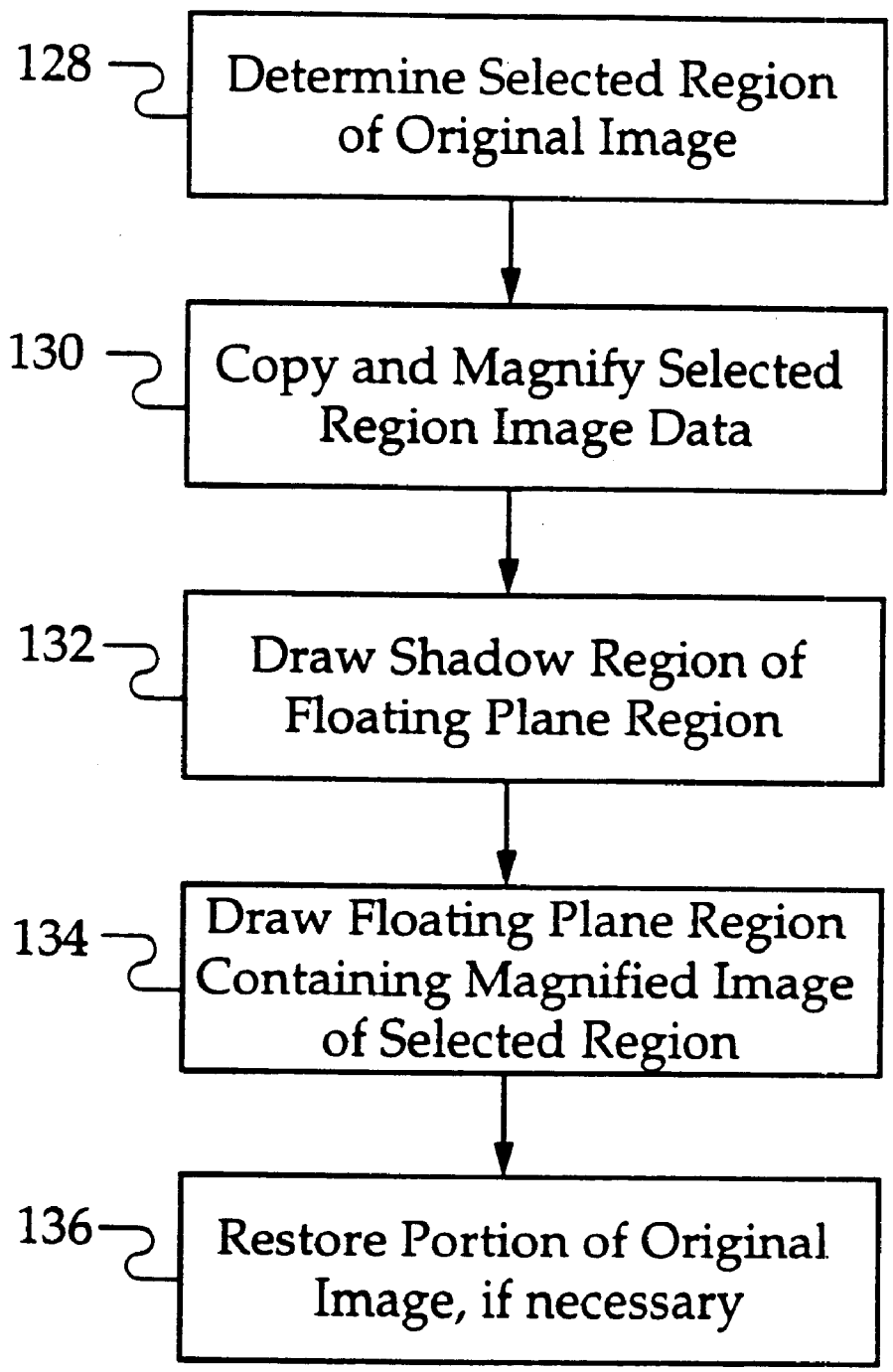
FIG. 10 is a flow diagram outlining the steps of a preferred embodiment of the present invention.

In a preferred embodiment, the present method for digital image magnification in a graphical user interface is implemented on a device including a microprocessor connected to a display and a pointing device. For example, the present invention is executable on a Sega Saturn system. However, the present method also may be implemented on a common desktop computer, a video game, a video editing or viewing system, or a desktop publishing system by one skilled in the art. As illustrated in FIG. 10, the position of a user-controlled pointing device determines a selected region of the original image (block 128). The microprocessor then executes commands (block 130) to copy or otherwise acquire image data within the selected region and magnify it by standard methods. This image data may be represented in the form of pixels, a page description language, or any another form. The microprocessor then draws the shadow region for the floating plane region (block 132) and draws the floating plane region containing the magnified image data (block 134). Because the user-operated pointing device may have caused the selected region to change position, the floating plane may have changed position accordingly. Consequently, a portion of the original image that was covered by a previous position of the floating plane may need to be restored. If this is the case, the microprocessor executes commands to restore this previously covered portion of the original image (block 136).

Figure 1:
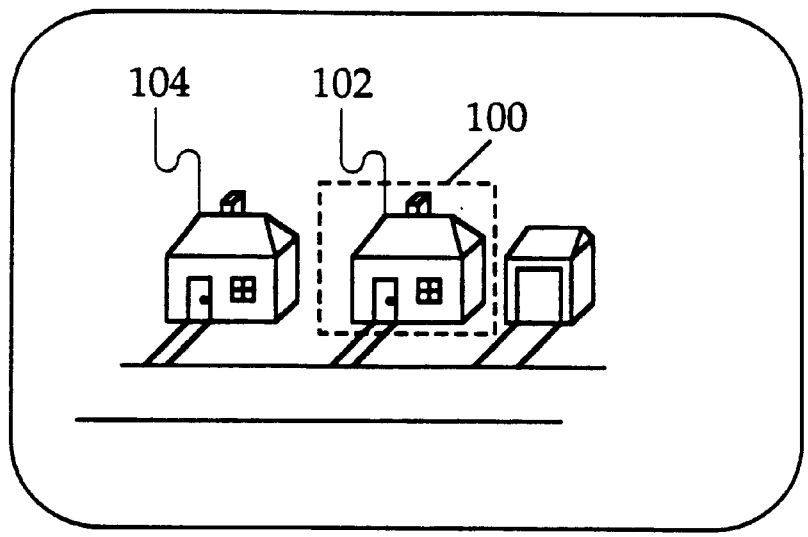
FIG. 1 shows an original unmagnified image as it is displayed on a typical computer or television screen.
Figure 2:
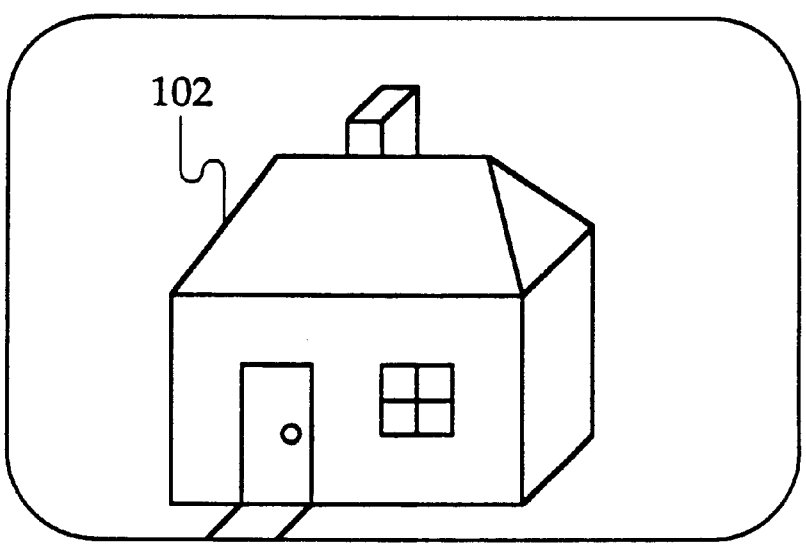
FIG. 2 shows the result of using a conventional magnification method to magnify the selected region of FIG. 1.

Referring again to FIGS. 1 and 2 and assuming FIGS. 1 and 2 represent a moving video image, in accordance with another aspect of the invention, it is possible to dynamically magnify a selected portion of a moving video image while preserving the visual context of the overall image. For example, assuming FIG. 2 represents a real time video surveillance image of a house, it is possible to selectively magnify a portion of the house such as a doorway or window to identify a person. Here also the preexisting visual context of the image is preserved.

The application to a moving image is accomplished, as is well known to those skilled in the art, by making appropriate timing modifications for refreshing the contents of the floating plane or magnifier. One normally needs to refresh the contents of the floating plane every time it is moved. In the case of dynamically magnifying a moving image, it is necessary to synchronize the refreshing of the contents of the floating plane with the movement of the underlying image data. For example, if the underlying image is running at 12 frames per second (fps), the contents of the magnified floating plane must be refreshed in synchronization with the 12 fps movement of the image. Synchronization and data refresh techniques are well known to those skilled in the art and can be readily implemented by one skilled in the art with respect to the present invention to provide dynamic magnification of a moving image while preserving the visual context of the overall image.

The hardware required to implement the above described functions is well known in the art. In a preferred embodiment, a customized video processor is used to perform the required video display functions. In addition, anyone of ordinary skill in the art of computer programming is able to appropriately program a microprocessor to magnify image regions in accordance with the present teaching.

Although the foregoing description contains many details particular to specific embodiments of the present invention, these details are for the purpose of illustrating and enabling such embodiments, and are not intended to limit the scope of the invention. Accordingly, the scope of the invention should be determined by the following claims and their legal equivalents.

What is claimed is:

1. A system including:
   a screen; and
   a computer including a computer program for digital image magnification on the screen, the program including computer executable commands that cause the computer to
      receive from a user an indication of a selected region of an original image on the screen,
      superimpose on the original image a floating plane region on the screen containing a magnified image of the selected region, wherein the floating plane region has an area larger than an area of the selected region and smaller than an area of the original image, such that the selected region of the original image is magnified and viewed while preserving the context of the selected region,
      move the selected region,
      move the floating plane region and dynamically update the magnified image as the selected region moves to preserve the context of the original image, and
      restore a portion of the image which was previously covered by the floating plane region;
   wherein the floating plane region is superimposed on the original image such that the floating plane region covers the selected region of the original image;
   wherein the original image and the magnified image include moving video, and the program includes computer executable commands to synchronize the refreshing of the floating plane with movement of the underlying image data of the video.

2. The system of claim 1, including moving the selected region in response to a user-controlled pointing device.

3. A system including:
   a screen; and
   a computer including a computer program for digital image magnification on the screen, the program including computer executable commands that cause the computer to
      receive from a user an indication of a selected region of an original image on the screen,
      superimpose on the original image a floating plane region on the screen containing a magnified image of the selected region, wherein the floating plane region has an area larger than an area of the selected region and smaller than an area of the original image, such that the selected region of the original image is magnified and viewed while preserving the context of the selected region,
      move the selected region,
      move the floating plane region and dynamically update the magnified image as the selected region moves to preserve the context of the original image, and
      restore a portion of the image which was previously covered by the floating plane region;
   wherein the floating plane region has the shape of a magnifying glass, and wherein a representation of a handle of a magnifying glass is displayed coupled to the floating plane region
   the program including executable commands to synchronize the refreshing of the floating plane with movement of the underlying image data of the video.

4. The system of claim 3, including moving the selected region in response to a user-controlled pointing device.

5. A system including:
   a screen; and
   a computer including a computer program for digital image magnification on the screen, the program including computer executable commands that cause the computer to
      receive from a user an indication of a selected region of an original image on the screen,
      superimpose on the original image a floating plane region on the screen containing a magnified image of the selected region, wherein the floating plane region has an area larger than an area of the selected region and smaller than an area of the original image, such that the selected region of the original image is magnified and viewed while preserving the context of the selected region,
      superimpose on the original image a shadow region corresponding to the floating plane region, the shadow region corresponding to a shadow having the same dimensions of the floating plane region;
      move the selected region,
      move the floating plane region and dynamically update the magnified image as the selected region moves to preserve the context of the original image, and
      restore a portion of the image which was previously covered by the floating plane region;
   wherein the original image and the magnified image include moving video, and wherein the magnified image is partially transparent, allowing a user to distinguish at least a portion of the original image below the magnified image while at the same time being able to distinguish the magnified image;
   the program including executable commands to synchronize the refreshing of the floating plane with movement of the underlying image data of the video.

6. The system of claim 5, including moving the selected region in response to a user-controlled pointing device.

7. A system including:
   means for displaying;
   means for receiving from a user an indication of a selected region of an original image on the means for displaying;
   means for superimposing on the original image a floating plane region on the means for displaying containing a magnified image of the selected region, wherein the floating plane region has an area larger than an area of the selected region and smaller than an area of the original image, such that the selected region of the original image is magnified and viewed while preserving the context of the selected region;

means for moving the selected region;

means for moving the floating plane region and dynamically updating the magnified image as the selected region moves to preserve the context of the original image; and means for restoring a portion of the image which was previously covered by the floating plane region;

wherein the floating plane region is superimposed on the original image such that the floating plane region covers the selected region of the original image;

means for synchronizing refreshing of the floating plane with movement of underlying image data of moving video.

8. The system of claim 7, including means for moving the selected region in response to a user-controlled pointing device.

* * * * *